(12) United States Patent
Madan et al.

(10) Patent No.: US 8,762,337 B2
(45) Date of Patent: Jun. 24, 2014

(54) STORAGE REPLICATION SYSTEMS AND METHODS

(75) Inventors: Nitin Madan, Sunnyvale, CA (US); Subrahmanyam Josyula, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 762 days.

(21) Appl. No.: 12/610,107

(22) Filed: Oct. 30, 2009

(65) Prior Publication Data

US 2011/0106763 A1     May 5, 2011

(51) Int. Cl.
*G06F 17/30*     (2006.01)

(52) U.S. Cl.
USPC ......................................................... 707/639

(58) Field of Classification Search
None
See application file for complete search history.

(56) References Cited

U.S. PATENT DOCUMENTS

| | | | |
|---|---|---|---|
| 7,100,089 B1* | 8/2006 | Phelps | 714/42 |
| 7,392,356 B1* | 6/2008 | Hardman | 711/162 |
| 7,451,168 B1* | 11/2008 | Patterson | 707/999.104 |
| 7,523,276 B1* | 4/2009 | Shankar | 711/162 |
| 2008/0222376 A1* | 9/2008 | Burton et al. | 711/162 |
| 2010/0274983 A1* | 10/2010 | Murphy et al. | 711/162 |
| 2011/0099148 A1* | 4/2011 | Bruning, III | 707/639 |

* cited by examiner

*Primary Examiner* — Yuk Ting Choi

(74) *Attorney, Agent, or Firm* — Wilmer Cutler Pickering Hale and Dorr LLP

(57) ABSTRACT

Systems and methods for information storage replication are presented. In one embodiment a replication method includes performing an intelligent synchronization process of selected portions of a primary image and intelligent verification of the accuracy of the replication. The intelligent synchronization process can include forwarding information if the information is in use (e.g., has been altered, written to, etc.) and the intelligent verification can be performed on the information in use.

19 Claims, 15 Drawing Sheets

900

910
Quiescing a primary system.

920
Determining identification of information in the primary system storage resources that is in use.

930
Taking an image snapshot of the primary system storage information including information that is in use.

940
Injecting a marker in a data stream from the primary system.

950
Un-Quiescing the primary system.

960
Taking a snapshot of secondary system storage information that correspond to information in use.

970
Comparing said snapshot of said primary system storage information to the snapshot of said secondary system storage information

980
Performing a correction process for portions of the secondary system storage information that does not match corresponding portions of the primary system storage information.

| |
|---|
| 1110<br>Intelligent Initial Synchronization Module |
| 1120<br>Intelligent Initial Verification Module |

| 1210<br>Start Module |
| --- |
| 1220<br>End of Volume Identification Module |
| 1230<br>Relevant Storage Location Identification Module |
| 1235<br>Information Forwarding Module |
| 1240<br>Range Incrementation Module |
| 1250<br>Synchronizing Completion Module |

| 1310 Primary System Quiescing Module |
|---|
| 1320 Relevant Storage Location Identification Module |
| 1330 Primary System Snapshot Module |
| 1340 Marker Injection Module |
| 1350 Primary System Un-Quiescing Module |
| 1360 Secondary System Snapshot Module |
| 1370 Snapshot Comparison Module |
| 1380 Correction Module |

FIG 13

STORAGE REPLICATION SYSTEMS AND METHODS

FIELD OF THE INVENTION

The present embodiments relate to the field of information storage replication.

BACKGROUND OF THE INVENTION

Electronic systems and circuits are often utilized in a number of applications to achieve advantageous results. Numerous electronic technologies such as computers, video equipment, and communication systems facilitate increased productivity and cost reduction in analyzing and communicating information in most areas of business, science, education and entertainment. Frequently, these activities involve vast amounts of information and significant resources are expended developing the information. Complex systems and vast amounts of information often result in greater susceptibility to disastrous information corruption and loss. Maintaining accurate replicated images of the information for is often very important for a variety or reasons (e.g., disaster recovery, corruption correction, etc.).

Maintaining large duplicate storage images is usually very resource intensive. Approaches that completely copy an entire storage image can result in significant delays and impacts on system processing and communication networks. While some traditional replication approaches are implemented at a block level, the entire complete volume is still copied and/or analyzed. Some conventional approaches perform a full synchronization and copy of information in each and every block in a volume. Other systems perform a differential analysis in which information in each and every block in volume is analyzed to determine if there is a difference and those that are different are copy. Approaches that copy and/or analyze information in each and every block in a volume consume significant storage, processing and communication resources.

SUMMARY

Systems and methods for information storage replication are presented. In one embodiment, a replication method includes performing an intelligent synchronization process of selected portions of a primary image that are in use and intelligent verification of the accuracy of the replication. The intelligent synchronization process can include forwarding information if the information is in use and the intelligent verification can be performed on the information if in use. In one embodiment, a replication method includes performing an intelligent synchronization process of relevant portions of a primary image and a secondary storage verification process. The intelligent synchronization process can include forwarding information if the information is in use (e.g., been altered, written to, etc.). The storage range can be similar to a storage block and the storage range can be dynamically configurable.

In one exemplary implementation, the intelligent storage verification process includes quiescing a primary system; determining portions of the primary system storage resources that have been written to; taking a snapshot of the primary system storage resources that have been written to; injecting a marker in a data stream from the primary system; taking a snapshot of secondary system storage resources that correspond to the primary system storage resources that have been written to; and comparing the snapshot of the primary system storage resources to the snapshot of the secondary system storage resources. In one embodiment a secondary storage verification process can include a correction process for correcting portions of the snapshot of the secondary system storage resources that do not match portions of the snapshot of the primary system storage resources.

In one embodiment an intelligent synchronization process includes determining if information within a storage range is in use; forwarding information if the information is in use; and incrementing a storage location indication in accordance with the storage range. The information can include information that has been written to. In one exemplary implementation, mapping indications of storage locations that have been written to are retrieved (e.g., querying a file system, etc.) and examined. Information in use is forwarded to a secondary storage resource. The secondary storage resource can be a thinly provisioned storage resource. The range can be configurable.

In one embodiment a multivolume file system includes a computer system having a processor coupled to a computer readable storage media and executing computer readable code which causes the computer system to: perform an intelligent synchronization process of relevant portions of an image; and perform an intelligent verification process, wherein said intelligent storage verification process comprises: quiesce a primary system; determine portions of said primary system storage resources that are in use; take a snapshot of said primary system storage information that is in use; inject a marker in a data stream from said primary system; take a snapshot of secondary system storage information that is in use; and compare said snapshot of said primary system storage information resources to said snapshot of said secondary system storage information. The intelligent synchronization process includes determining if information within a storage range is in use; forwarding information if said information is in use; and incrementing a storage location indication in accordance with said storage range. The intelligent synchronization process also includes determining if information is in use includes querying a file system.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 9 is a flow chart of an exemplary verification process in accordance with one embodiment.

FIG. 11 is a block diagram of an exemplary replication module in accordance with one embodiment.

FIG. 12 is a block diagram of an exemplary Intelligent Synchronization Module in accordance with one embodiment.

FIG. 13 is a block diagram of an exemplary Intelligent Verification Module in accordance with one embodiment.

DETAILED DESCRIPTION

Figure 1:
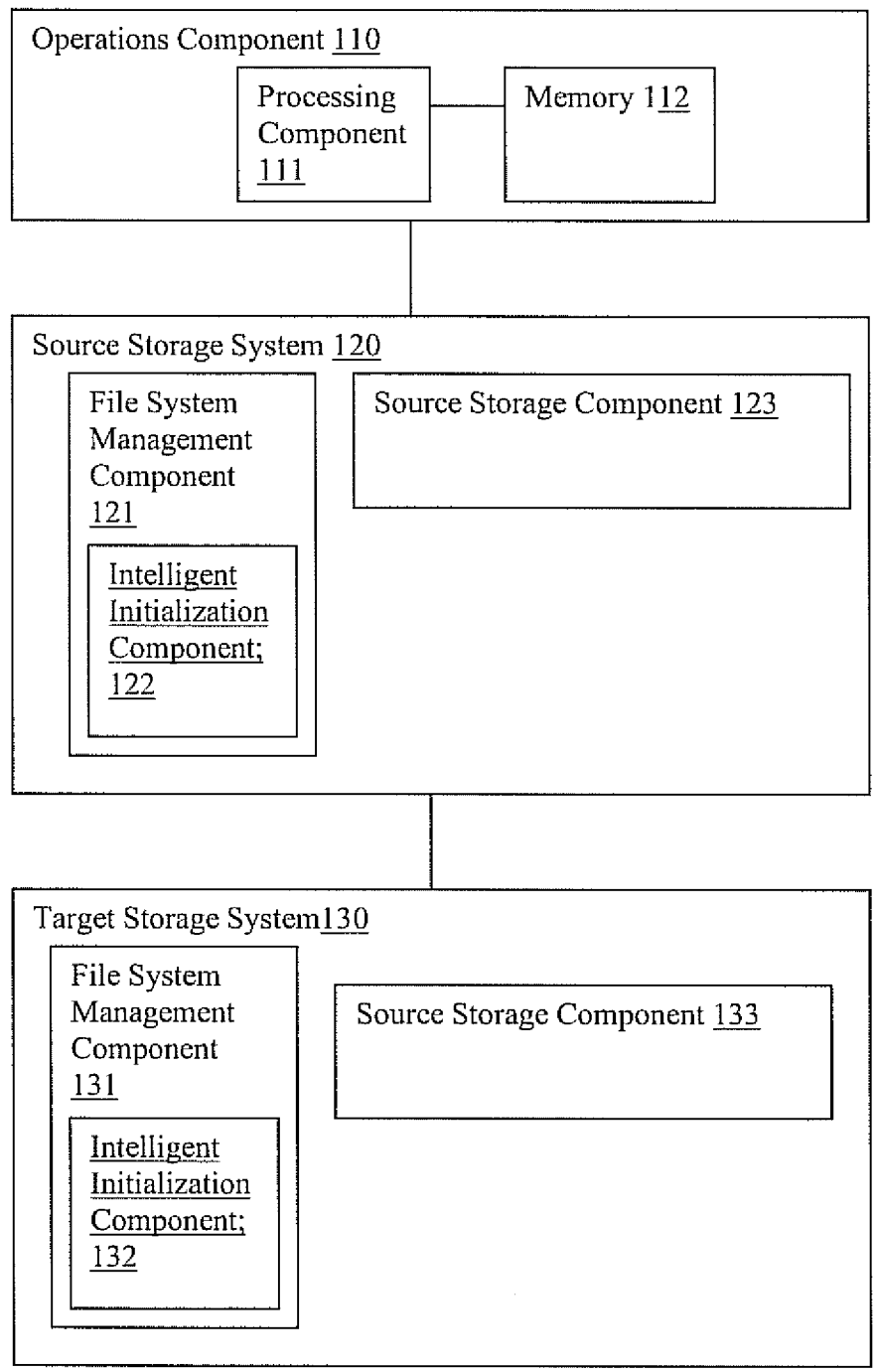
FIG. 1 is a block diagram of an exemplary system in accordance with one embodiment.

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, it will be obvious to one ordinarily skilled in the art that the present invention may be practiced without these specific details. In other instances, well known methods, procedures, components, and circuits have not been described in detail as not to unnecessarily obscure aspects of the current invention.

The present replication systems and methods facilitate efficient and effective protection of information in a variety of system configurations. Replication systems and methods facilitate utilization of file system resources to reduce time and occupation of resources during replication operations. In one embodiment, a replication system manages storage of information in a source storage component image and intelligent replication of the information in a target storage component. The intelligent replication performs replication of relevant information (e.g., information that is in use, information that is written to designated volumes, etc.) while minimizing communication and storage of nonrelevant information. In one embodiment, a logging service can track storage locations that are in use (e.g., updated, modified, input operations, written to, etc.). In one exemplary implementation, a file system tracks the layout of the data in the data volume, including free and used storage locations, and the file system is queried to identify portions of a source storage resource image that are in use and information associated with those portions is selectively forwarded for duplicative or replication storage. Information in irrelevant or non-used source storage locations is not forwarded for replication.

Intelligent verification of the accuracy of the duplicative or replication storage can be performed. In one embodiment, the portions of a target storage resource that are utilized for replication storage are compared to source storage resources that are in use, while minimizing verification or comparison activities on non-relevant or unused portions of the respective storage resources. In one exemplary implementation, the verification is performed on a block level. For example, checksums on a block level are calculated and compared for replication accuracy at the block level. Again, file system information on used and free storage locations can be utilized to verify information in storage regions that are in use while minimizing expenditure of resources on information in storage regions that are not in use.

It is appreciated that present replication system and methods facilitate incremental file-level replication. The replication systems and methods are compatible with partial file system replication of large file systems. The partial file system replication can be directed to updating a portion of a secondary or target storage resource during each replication operation. For example, a portion of a primary or source storage resource image that changes during a session is updated during a replication operation. In one embodiment, thin provisioned target or secondary storage resources can be utilized. In one exemplary implementation, information is migrated from a thick volume on the source or primary system side to a thin volume on the target or secondary system side.

It is appreciated present systems and methods can be implemented in a variety of architectures and configurations. For example, present systems and methods can be implemented as part of a distributed computing environment, a cloud computing environment, a client server environment, etc. In one embodiment, a replication system includes storage resources and it is also appreciated that the present systems and methods can be implemented in a variety of storage configurations. For example, the storage resources can be configured as source storage resources and target storage resources, primary storage resources and secondary storage resources, production side storage resources and failover side storage resources, etc. FIG. 1 is a block diagram of exemplary system 100 in accordance with one embodiment. System 100 includes operations component 110 communicatively coupled to source storage system 120 which is communicatively coupled to target storage system 130. Operations component 110 includes processing component 111 and optional memory component 112. Source storage system 120 includes files system management component 121 and source storage component 123. Files system management component 121 includes intelligent replication component 122. Target storage system 130 includes files system management component 131 and source storage component 133. Files system management component 131 includes intelligent replication component 132.

It is appreciated that exemplary system 100 can have a variety of configurations. For example, operations component 110 and source storage system 120 can be part of a local system or facility and target storage system 130 can be part of a remote system or facility. It is appreciated that the processing component 111 can receive information (e.g., instructions, data, etc.) from source storage component 123 and vice versa. In one exemplary implementation, operations component 110 is part of a local system or facility while source storage system 120 and target storage system 130 are part of a remote system or facility.

It is appreciated there can be a variety of operation component and source storage component configurations. Information can be communicated between multiple operation components (not shown) and source storage system 120. Information can also be communicated between multiple storage systems and an operation component. It is also appreciated there can be a variety of source storage system and target storage system configurations. A source storage system can communicate with multiple target storage systems and multiple target storage systems can communicate with a source storage system.

The components of system 100 cooperatively operate to facilitate a variety of operations (e.g., application operations, etc.) with source storage and efficient and effective replicated target storage. Operations component 110 can perform a variety of operations. For example, memory 112 stores a variety of application operation instructions which are performed by processor 111. Source Storage System 120 stores information (e.g., in source stage component 123) associated with the operations performed by operations component 110. File system management component 121 manages storage of information received from operations components 110 and forwarding of information to target storage system 130. File system management component 121 includes intelligent replication component 122 which performs intelligent collection of information (e.g., relevant information, information in use, information that has been changed or written to, etc.) for forwarding to target storage system 130 and participates in intelligent verification operations (e.g., verification of accurate storage of relevant information, information in use, information that has been changed or written to, etc). Target storage system 130 stores replications of information images from source storage component 123. File system management component 131 manages storage of information received from source storage system 120. File system management component 131 includes intelligent replication component 132 which participates in intelligent replication of target storage system 130 including participating in intelligent verification operations. In one embodiment, intelligent replication component 222 and 232 participate in replication processes.

Figure 2:
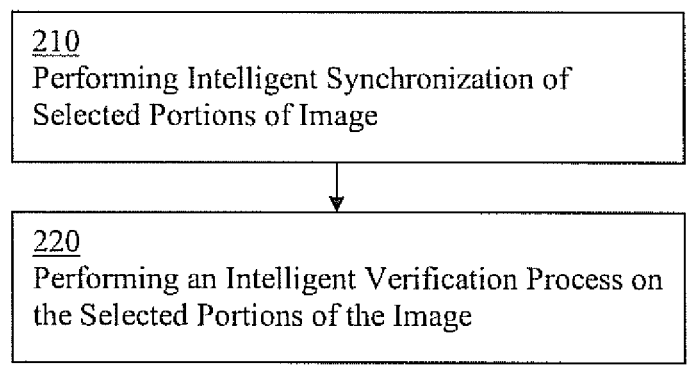
FIG. 2 is a flow chart of an exemplary replication method in accordance with one embodiment.

FIG. 2 is a flow chart of replication method 200 in accordance with one embodiment. In one embodiment, replication method 200 facilitates efficient and intelligent replication of information. In one exemplary implementation, the primary image is included in a primary storage resource (e.g., a production side storage resource, a source storage resource, etc.) and the secondary image is included in a secondary storage resource (e.g., a failover side storage resource, a target storage resource, etc.). It is appreciated that instructions or implementing methods described here can embedded on a computer readable medium and implemented by processing devices in accordance with the instructions.

In block 210, an intelligent synchronization process of relevant portions of an image is performed. In one embodiment, the intelligent synchronization process includes forwarding information associated with information within a storage range if the information is in use. In one exemplary implementation, the intelligent synchronization process includes forwarding information within a storage range if the information has been written to or altered.

In block 220, an intelligent verification process is performed. In one embodiment, the verification process confirms the relevant secondary storage information (e.g., information that is written to, changed, etc.) is an accurate replication of the corresponding primary storage information. In one exemplary implementation, the confirmation includes comparing the accuracy of the copy of the relevant information (e.g., information in use, written to, etc.) without expending time and resources on other information that is not relevant (e.g., default startup settings that do not correspond to operations, arbitrary information, etc.).

With reference again to FIG. 1, it is appreciated that as operation component 110 performs operations and changes can occur to information in source storage systems 120. The changes to the source storage system image occur over time as the operations proceed. However, in one embodiment, the replication update of the source storage system image to an associated target storage system image occurs at a designated time (e.g., in accordance with a trigger event). At the "checkpoint" (e.g., predetermined time duration, occurrence of an event, after the occurrence of a particular number of changes, etc.) the source storage system image is frozen or locked and the image changes are replicated on an associated target storage system image and the associated target storage system image is updated.

Figure 3:
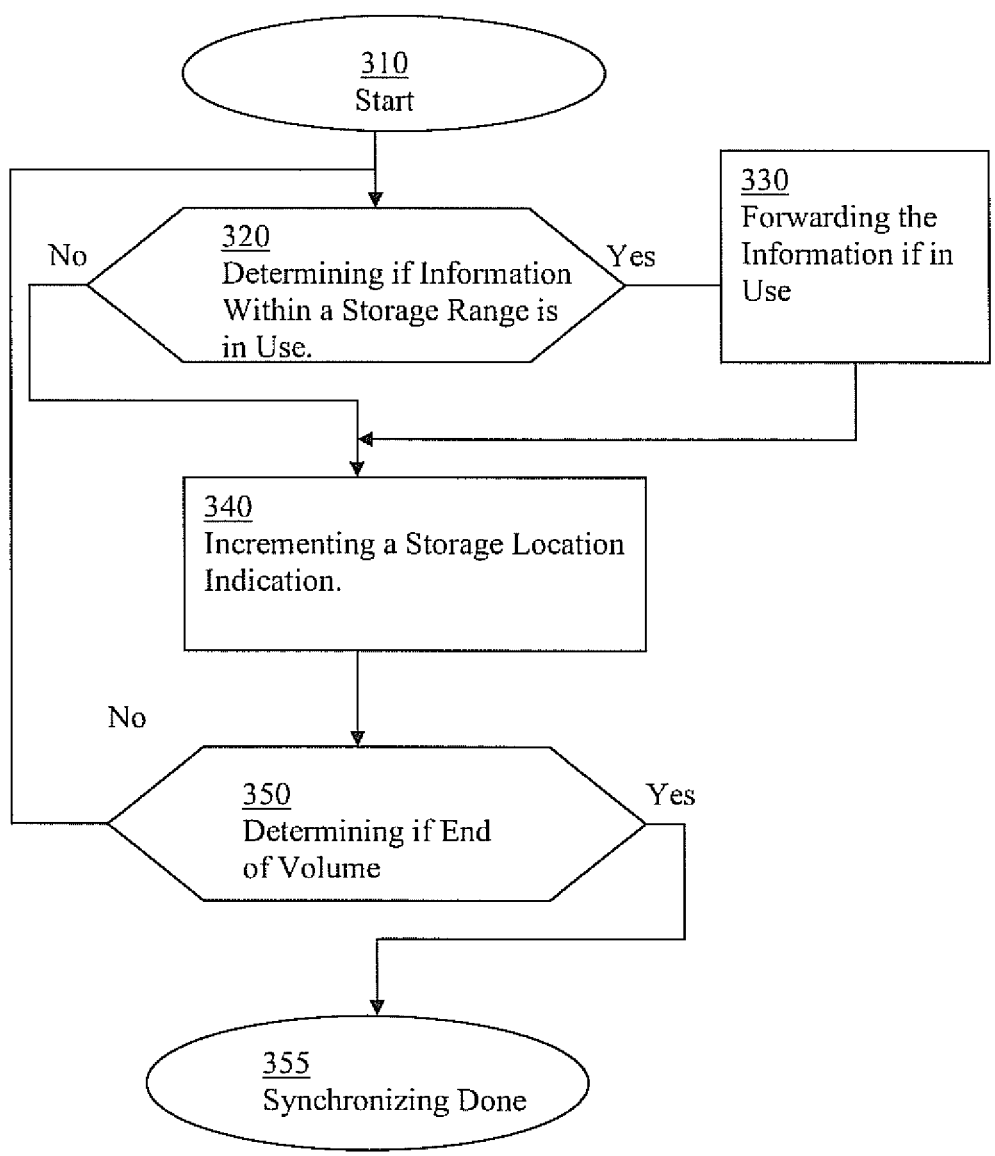
FIG. 3 is a flow chart of an exemplary intelligent synchronization process in accordance with an embodiment.

FIG. 3 is a flow chart of an exemplary intelligent synchronization process 800 in accordance with an embodiment.

In block 310, an intelligent synchronization process is started. It is appreciated that an intelligent synchronization process can be started or triggered by a variety of conditions. In one embodiment, the synchronization process is started after a period of time in which operations have been proceeding (e.g., 10 minutes after operations begin, 2 days after operations begin, etc.). The synchronization process can be started after a specific number of operations have been performed (e.g., 1000 operations, 700 writes, etc.). In one embodiment, an initial memory location (relative memory location 0, physical memory address, etc.) or block (e.g., block 511, etc.) is specified.

A determination is made at block 320 if information within a storage range is in use. In one embodiment, the determining includes determining which storage locations have been accessed or written to. In one exemplary implementation, the determining includes retrieving and examining mapping indications of information in use (e.g., storage locations that have been written to, information that has been changed, etc.). The determining if information in use can include querying a file system. In one embodiment, the file system returns a map (e.g., a bitmap, etc.) indicating information in use or indications of storage locations of information in use.

It is appreciated the range is configurable. In one embodiment, the range is a number of storage locations or addresses. The range can be a block of storage locations. The blocks can be configured to correspond to natural boundaries of the storage resources.

At block 330, information is forwarded if the information within the storage range is in use. In one embodiment, the information is forwarded to a secondary storage resource. In one exemplary implementation, the secondary storage resource (e.g., target resource, fail safe side resource, etc.) is a thinly provisioned storage resource. The primary storage resource (e.g., source storage resource, production side resource, etc.) can be a thick provisioned storage resource while the secondary storage resource is a thinly provisioned storage resource.

In block 340, a storage location indication is incremented. In one embodiment, the storage location indication is incremented in accordance with the storage range. As indicated in block 810, an memory location (e.g., beginning of a volume, relative memory location 0, physical memory address, etc.) or block (e.g., block 511, etc.) is specified and the storage location indication is incremented to point to the beginning of the next range or block (e.g., block 512, etc.) of information.

In block 350, a determination is made if the end of a volume has been reached. If the end of volume has not been reached the process returns to block 820. If the end of volume has been reached the process proceeds to block 855.

In block 355, the synchronizing is completed. In one embodiment, a verification process is performed to check if the replication is accurate.

Figure 4:
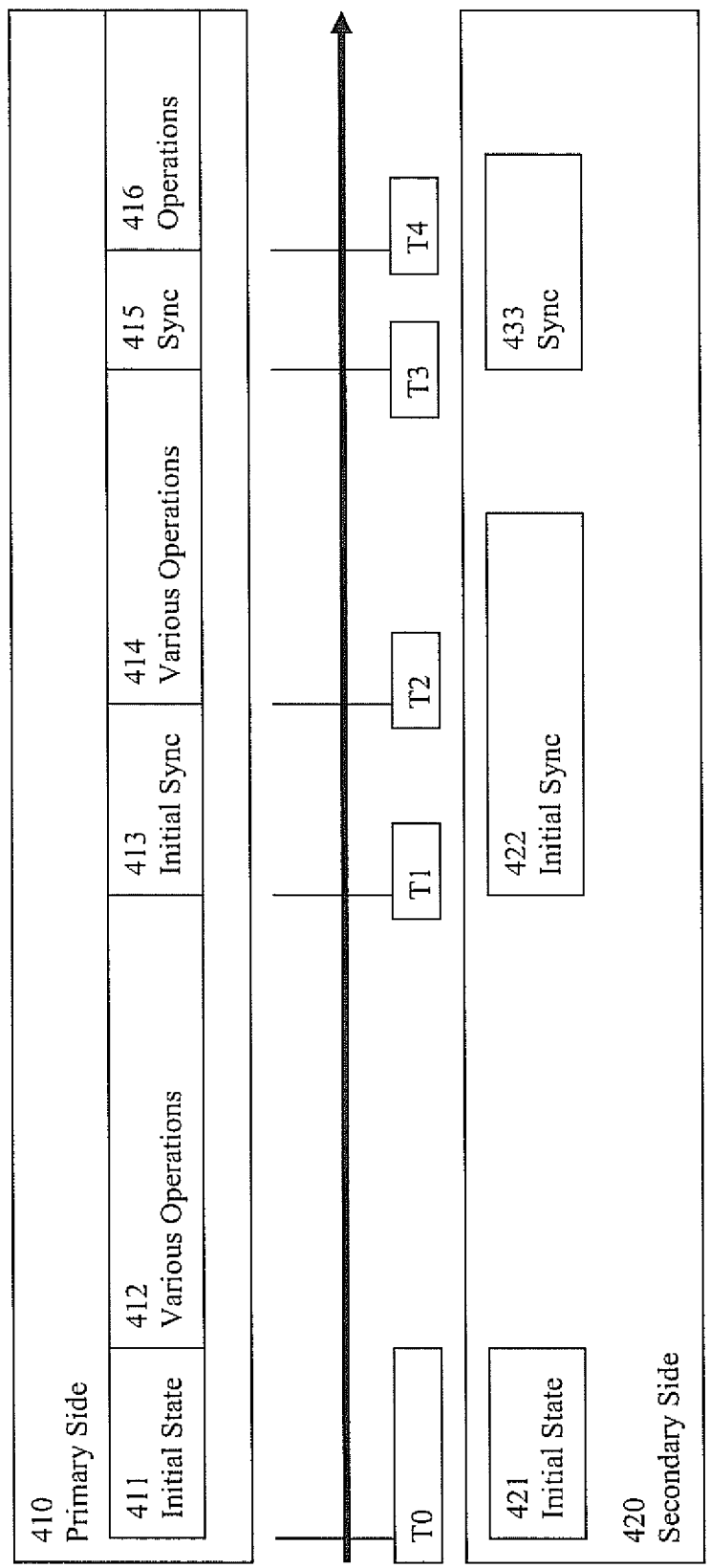
FIG. 4 is a block diagram time line representation of exemplary changes in a source storage system and target storage system as operations occur in accordance with one embodiment.

FIG. 4 is a time line diagram representation of exemplary changes in a source storage system and target storage system as operations occur between time t0 and time t4 in accordance with one embodiment. At time t0 there is an image state 411 in the primary side 410 and an image state 421 in the secondary side 420. The first operation session 412 begins at time t0 and runs to time t1. It is appreciated that the there can be numerous operations in a session and session lengths can vary. It is also appreciated session lengths can be lengthened or shortened.

At time t1 intelligent replication synchronization 413 begins in primary side 410 and intelligent replication synchronization 422 begins in secondary side 420. In one embodiment, intelligent replication synchronization 413 queries the storage locations in the primary side that are in use and forwards the information form those storage locations to secondary side 420. Intelligent replication synchronization 422 manages receipt and writing on the secondary side 420 of information received from primary side 410. In one exemplary implementation, various operations 414 can begin on the primary side at time t2 even though the intelligent synchronization 422 activities have not completed. In one embodiment, operations continue to proceed and intervening information is tracked while a target or secondary storage system image is frozen during the synchronization (e.g., intelligent sync 422, etc.). When the target or secondary storage system image is unlocked, the secondary storage system image is updated to correspond to with the tracked intervening information. In one embodiment, snapshots and markers are utilized to coordinate the replication synchronization. In one embodiment, intelligent replication synchronization 413 and intelligent replication synchronization 422 can also participate in verification processes. At time t4 further intelligent synchronization activities 415 and 433 occur and various operations 416 continue.

Figure 5:
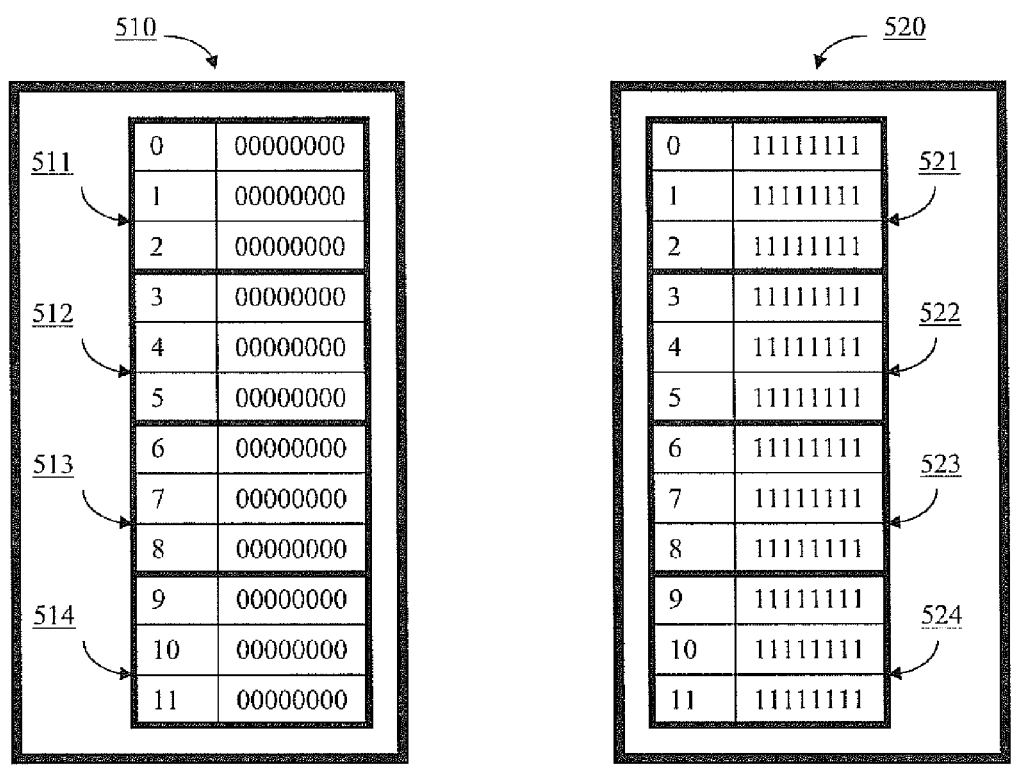
FIG. 5 is a block diagram of an exemplary startup image state of a primary storage volume and secondary storage volume in accordance with one embodiment.

FIG. 5 is a block diagram of an exemplary startup image state 500a of primary storage volume 510 and secondary storage volume 520 in accordance with one embodiment. Primary storage volume 510 includes storage ranges or blocks 511 through 514. Storage block 511 includes relative storage address locations 0 through 2, storage block 512 includes relative storage address locations 3 through 5, storage block 513 includes relative storage address locations 6 through 8, and storage block 514 includes relative storage address locations 9 through 11. The relative storage address locations 0 through 11 in primary storage volume 510 have corresponding information set to logical zeroes. Secondary storage volume 520 includes storage ranges or blocks 521 through 524. Storage block 521 includes relative storage address locations 0 through 2, storage block 522 includes relative storage address locations 3 through 5, storage block 523 includes relative storage address locations 6 through 8, and storage block 514 includes relative storage address locations 9 through 11. The relative storage address locations 0 through 11 in secondary storage volume 520 have corresponding information set to logical ones. It is appreciated that the startup or state of the information can be arbitrary and does not necessarily have to be set to logical zeroes and or logical ones. In one embodiment, primary storage volume 510 and secondary storage volume 520 are similar to state 411 and 421 of FIG. 4.

Figure 6:
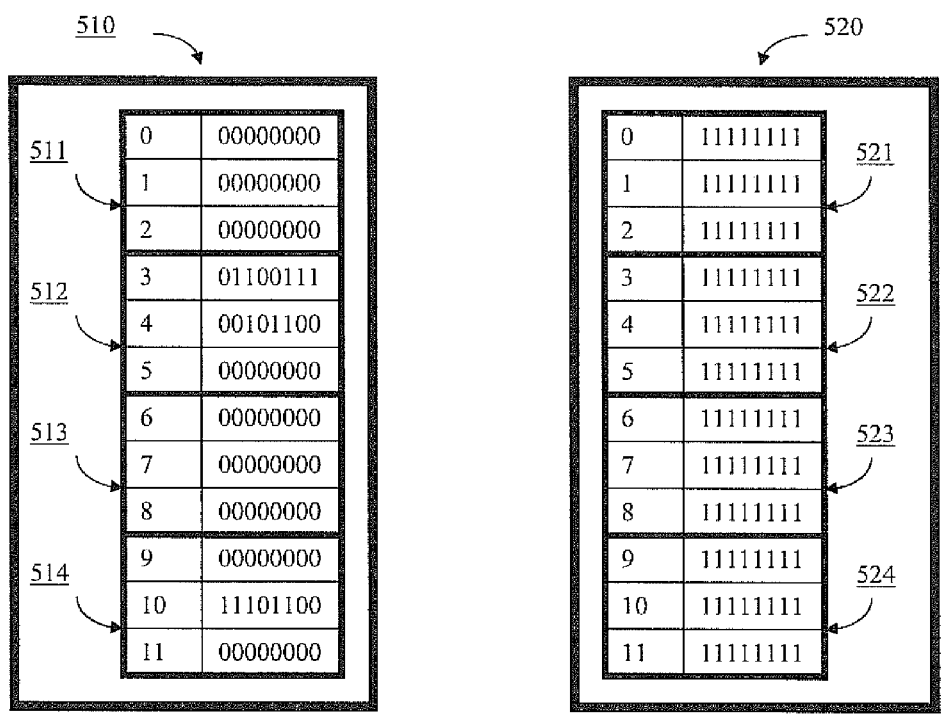
FIG. 6 is a block diagram of an exemplary operations image state of a primary storage volume and secondary storage volume in accordance with one embodiment.

FIG. 6 is a block diagram of an exemplary operations image state 500b of primary storage volume 510 and secondary storage volume 520 in accordance with one embodiment. In one embodiment, operations image state 500b represents the storage resources state after various operations have been performed including writes to storage locations in the primary storage volume 510. For example, information (e.g. 01100111) is written in relative storage address location 3 in block 512, information (e.g. 00101100) is written in relative storage address location 4 in block 512, and information (e.g. 11101100) is written in relative storage address location 10 in block 514.

Figure 7:
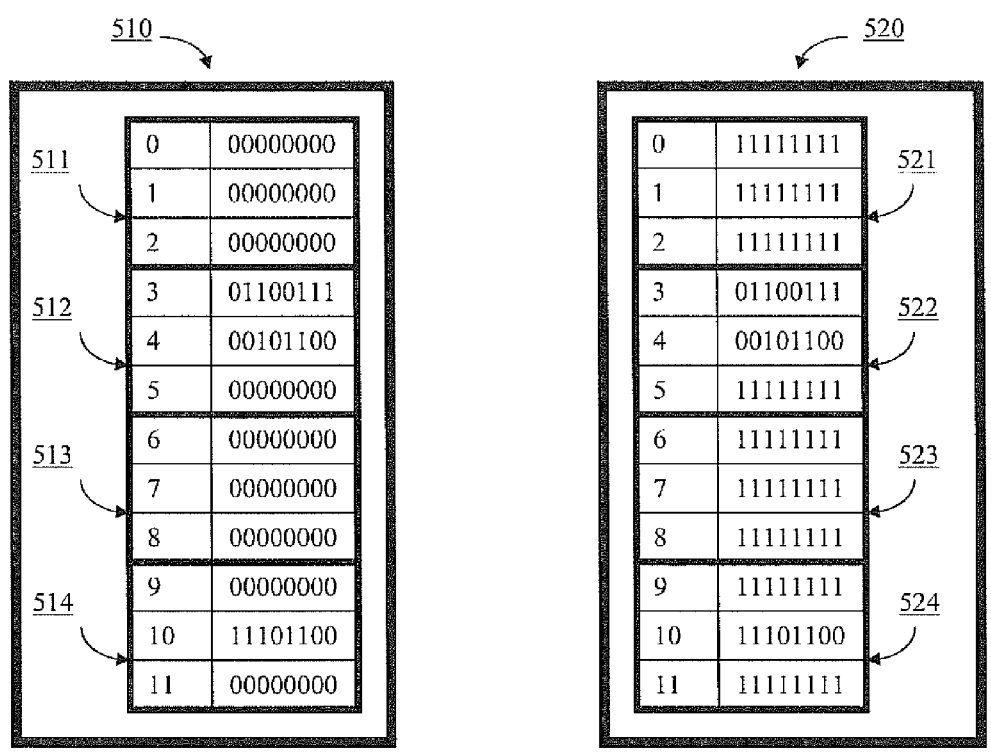
FIG. 7 is a block diagram of an exemplary intelligent replication state of a primary storage volume and secondary storage volume in accordance with one embodiment.

FIG. 7 is a block diagram of an exemplary intelligent replication state 500c of primary storage volume 510 and secondary storage volume 520 in accordance with one embodiment. In one embodiment, operations image state 500c represents the storage resources state after an intelligent replication update to storage locations in secondary storage volume 520. For example, information (e.g. 01100111) is written in relative storage address location 3 in block 522, information (e.g. 00101100) is written in relative storage address location 4 in block 522, and information (e.g. 11101100) is written in relative storage address location 10 and block 524. The storage address location 3, 4 and 10 are update without updating or replicating the image for the other storage locations.

Figure 8:
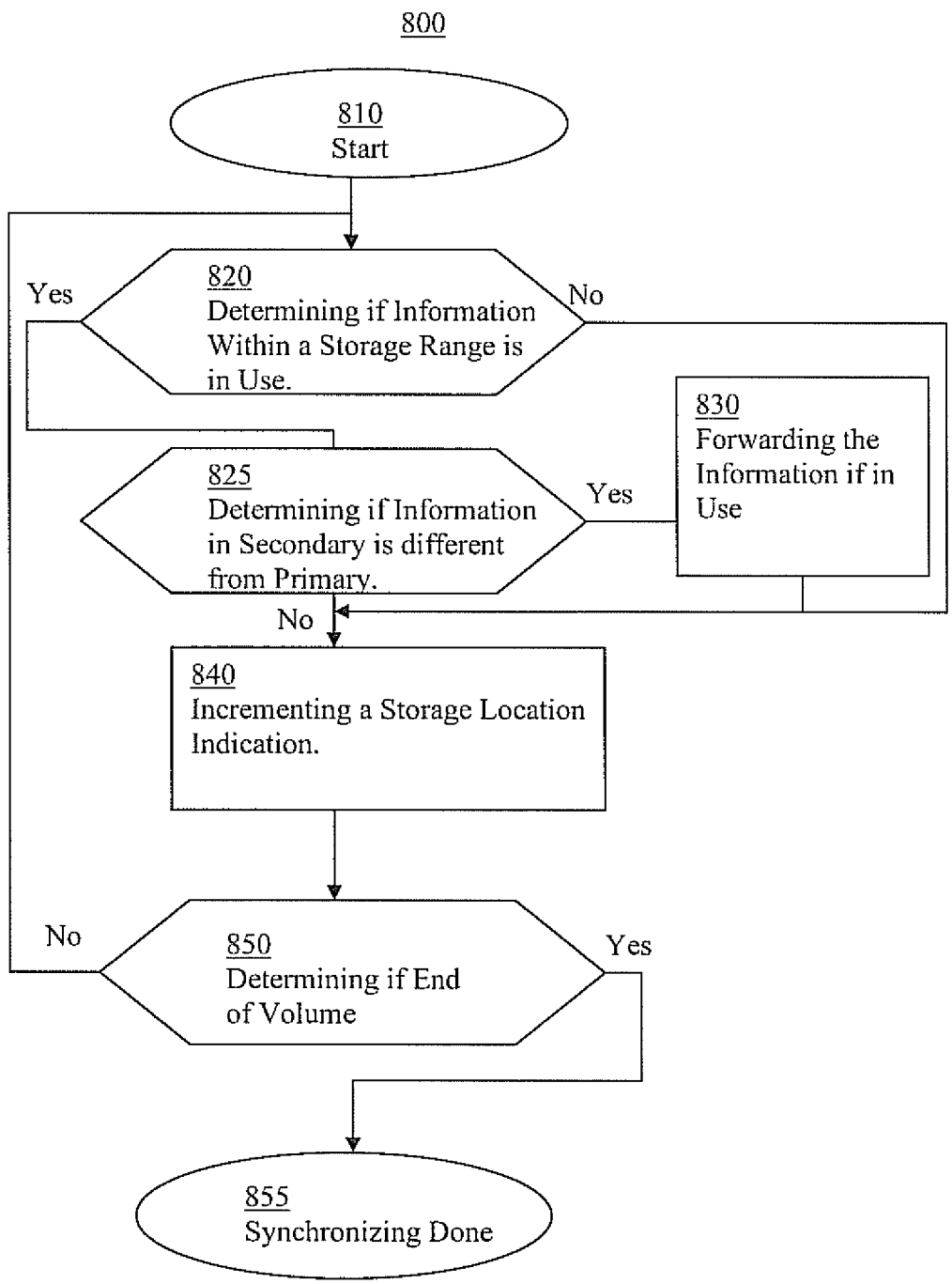
FIG. 8 is a flow chart of an exemplary intelligent synchronization process in accordance with an embodiment.

FIG. 8 is a flow chart of an exemplary intelligent synchronization process 800 in accordance with an embodiment.

In block 810, an intelligent synchronization process is started. It is appreciated that an intelligent synchronization process can be started or triggered by a variety of conditions. In one embodiment, the synchronization process is started after a period of time in which operations have been proceeding (e.g., 10 minutes after operations begin, 2 days after operations begin, etc.). The synchronization process can be started after a specific number of operations have been performed (e.g., 1000 operations, 700 writes, etc.). In one embodiment, an initial memory location (relative memory location 0, physical memory address, etc.) or block (e.g., block 511, etc.) is specified.

A determination is made at block 820 if information within a storage range is in use. In one embodiment, the determining includes determining which storage locations have been accessed or written to. In one exemplary implementation, the determining includes retrieving and examining mapping indications of information in use (e.g., storage locations that have been written to, information that has been changed, etc.). The determining if information in use can include querying a file system. In one embodiment, the file system returns a map (e.g., a bitmap, etc.) indicating information in use or indications of storage locations of information in use. If the block is not in use the process proceeds to block 840. If the block is in use the process proceeds to block 825.

It is appreciated the range is configurable. In one embodiment, the range is a number of storage locations or addresses. The range can be a block of storage locations. The blocks can be configured to correspond to natural boundaries of the storage resources.

At block 825, a determination is made if information in a primary side is different from a secondary side. In one embodiment, a checksum of blocks in use is performed. If the information is not different the process proceeds to block 840. If the information is different the process proceeds to block 830.

At block 830, information is forwarded if the information within the storage range is in use. In one embodiment, the information is forwarded to a secondary storage resource. In one exemplary implementation, the secondary storage resource (e.g., target resource, fail safe side resource, etc.) is a thinly provisioned storage resource. The primary storage resource (e.g., source storage resource, production side resource, etc.) can be a thick provisioned storage resource while the secondary storage resource is a thinly provisioned storage resource.

In block 840, a storage location indication is incremented. In one embodiment, the storage location indication is incremented in accordance with the storage range. As indicated in block 810, an memory location (e.g., beginning of a volume, relative memory location 0, physical memory address, etc.) or block (e.g., block 511, etc.) is specified and the storage location indication is incremented to point to the beginning of the next range or block (e.g., block 512, etc.) of information.

In block 850, a determination is made if the end of a volume has been reached. If the end of volume has not been reached the process returns to block 820. If the end of volume has been reached the process proceeds to block 855.

In block 855, the synchronizing is completed. In one embodiment, a verification process is performed to check if the replication is accurate.

FIG. 9 is a flow chart of an exemplary verification process 900 in accordance with one embodiment. In one embodiment, verification process 900 intelligently verifies that information from a primary or source storage resource is accurately copied in a secondary or target storage resource. In one exemplary implementation, the verification compares relevant information (e.g. information in use, written to, etc.) without comparing information that is not relevant.

In block 910, a primary system is made quiescent. In one exemplary implementation, operations are the primary side are halted (e.g., memory accesses, no writes, etc.) and the primary storage resource image is frozen.

A determination is made at block 920 identifying information in the primary system storage resources that are in use. In one exemplary implementation, locations or portions (e.g., ranges, blocks, etc.) of the primary system storage resources that are in use are identified. In one embodiment, indications of information that is in use from block 820 are utilized again. For example, a list of storage locations identified in block 820 can be used to identify storage locations with information from primary system storage resources which is utilized to confirm or verify the accuracy of the information in the secondary system storage resources.

At block 930, an image snapshot is taken of the primary system storage information that is in use. In one embodiment, the image snapshot of the primary system storage resources is temporarily stored in designated In block 940, a marker is injected in a data stream from the primary system. The marker indicates the point at which the snapshot of the primary side image was taken. In one embodiment the marker is a bogus write command after the snapshot is taken.

The primary system is un-quiesced at block 950. In one embodiment, primary side application operations resume. The operations can resume even if the replication update has not been completed. The intervening operations are tracked and later updated on the replication secondary side.

In block 960, an image snapshot is taken of the secondary system storage information that corresponds to information that is in use. In one embodiment, a snapshot is taken of secondary system storage resources that correspond to the primary system storage resources that have been written to.

At block 970, the snapshot of the primary system storage information is compared to the snapshot of the secondary system storage information. In one embodiment, a checksum of the image information in the snapshot of the primary system storage is compared to a checksum of the image information in the snapshot of the secondary system storage information.

In block 980, a correction process is performed for portions of the secondary system storage information that does not match portions of the corresponding primary system storage information. In one embodiment, the correction process includes retrieving information from the primary side that was not accurately replicated and rewriting the correct information to the secondary side. The correction process can include full synchronization or differential synchronization.

Figure 10:
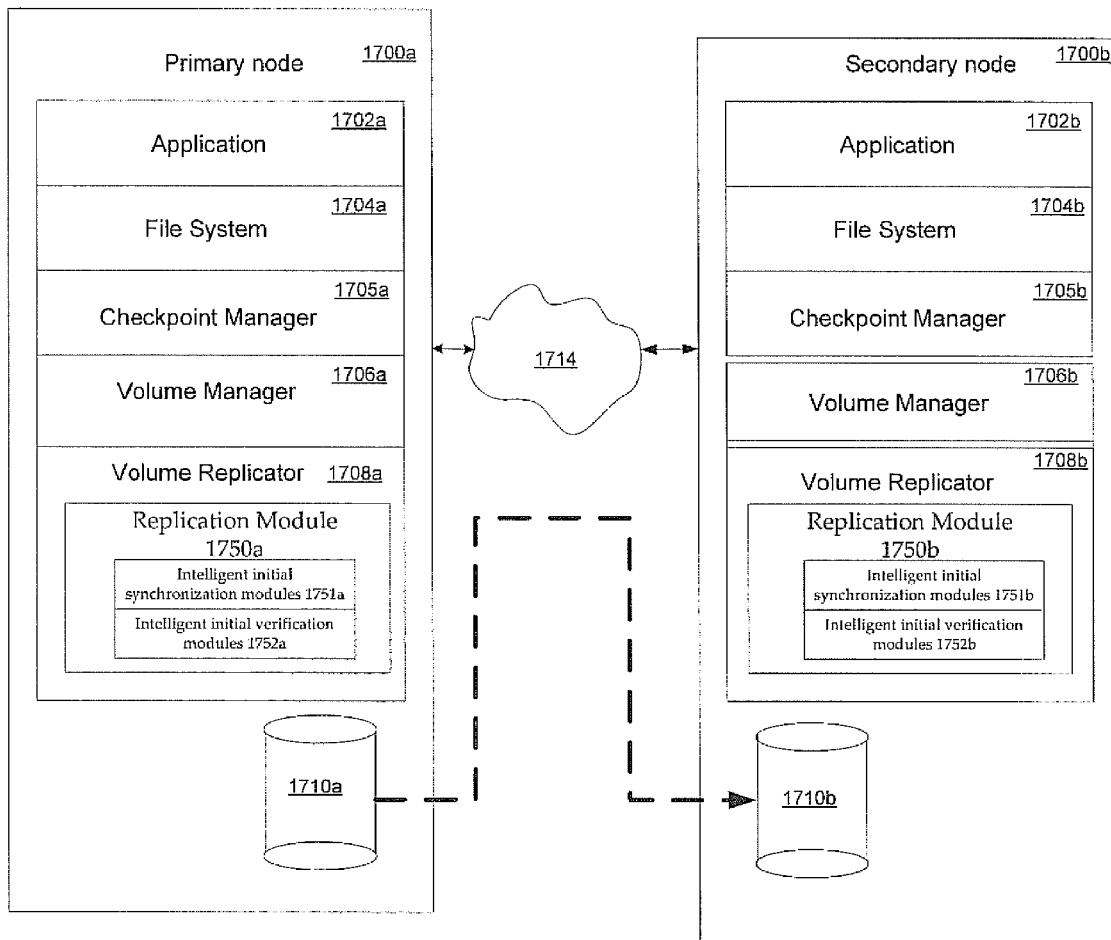
FIG. 10 illustrates an exemplary periodic replication operation within a replication system environment according to an embodiment.

FIG. 10 illustrates a periodic replication operation within a replication system environment 1700 according to an embodiment. In the illustrated embodiment, copies of incrementally modified or changed data of a primary data volume (Vol) within primary system 1700a are transferred to a replicated secondary data volume (R_Vol) within a secondary system 1700b periodically. To maintain the accessibility of the primary data volume, a point-in-time "snapshot" volume (S_Vol) is created and the periodic replication is performed using the snapshot volume. Similarly, to maintain the accessibility of the secondary data volume, a point-in-time "snapshot" volume (RS_Vol) is created and used at the secondary system 1700b to receive incremental changes from the primary system 1700a and to restore the replicated secondary data volume.

In the replication system of the illustrated embodiment, a primary node 1700a is coupled to a secondary system 1700b via a network 1714 (e.g., an IP network, LAN, WAN, or other communication link). Primary system 1700a and secondary system 1700b of the illustrated embodiment each respectively includes an application 1702, a file system 1704, a checkpoint manager 1705 and a volume manager 1706 including a volume replicator 1708 which can be implemented in respective processors and memory of primary system 1700a and secondary system 1700b. In one embodiment, the functionality for managing the creation of checkpoints is implemented by the checkpoint manager 1705. In one embodiment, replication system environment 1700 is synchronized via the use of an intelligent synchronization. During the synchronization, the relevant contents (e.g., information in use, etc.) of a primary data volume (Vol) within primary system 1700a are transferred to a replicated secondary data volume (R_Vol) within the secondary system 1700b. In one embodiment, to maintain the accessibility of the primary data volume, a point-in-time "snapshot" volume (S_Vol) is created at a "checkpoint" in time and the synchronization (as well as subsequent periodic replication) is performed using the snapshot volume. As the synchronization is being performed, updates (e.g., write operations or other changes) to the primary data volume are tracked for later use in performing periodic replication according to an embodiment.

Primary system 1700a further includes a primary data volume 1710a that includes a source storage resource image. Secondary system 1700b includes a secondary data volume 1710b that includes a target storage resource image. In one embodiment, volume replicator 1708a and 1708b include respective replication module 1750a and 1750b which include respective intelligent synchronization modules 1751a and 1751b for performing efficient intelligent replication updates and intelligent verification modules 1752a and 1752b for performing an efficient and intelligent verification of update accuracy. It is appreciated intelligent replication module and intelligent verification module can be implemented as part of a variety of environments. For example, an intelligent replication module and intelligent verification module can be implemented as part of a distributed computing environment, a cloud computing environment, a client server environment, etc.

FIG. 11 is a block diagram of exemplary replication module 1100 in accordance with one embodiment. In one exemplary implementation, replication module 1100 includes instructions stored on a computer readable medium. The replication module 1100 and computer readable medium can be utilized in replication system environment 1700. Replication module 1100 can include instructions for performing a replication method (e.g., method 300, etc.). Intelligent Synchronization Module 1110 intelligently synchronizes relevant portions of a source or primary storage resource to a target or secondary storage resource. Intelligent Verification Module 1120 intelligently verifies relevant portions of a source or primary storage resource are accurately copied to a target or secondary storage resource.

FIG. 12 is a block diagram of exemplary Intelligent Synchronization Module 1200 in accordance with one embodiment. In one exemplary implementation, Intelligent Synchronization Module 1200 is similar to Intelligent Verification Module 1120. Intelligent Verification Module 1120 can include instructions for performing an Intelligent Verification method (e.g., method 800, etc.). Start Module 1210 detects a replication synchronization trigger event and initiates intelligent synchronization. End of Volume Identification Module 1220 identifies an end of volume. Relevant Storage Location Identification Module 1230 identifies or determines relevant storage locations (e.g., locations that are in use, that have been written to, etc.). Information Forwarding Module 1235 forwards information from blocks in use from the primary source to the secondary source. In one embodiment, every block in use is forwarded. In another embodiment, a difference comparison is performed and the blocks with different information are forwarded. Range Incrementation Module 1240 increments the storage location range. Synchronization Completion Module 1250 finalizes the synchronization activities. In one embodiment Synchronization Completion Module 1250 initiates a verification process.

FIG. 13 is a block diagram of Intelligent Verification Module 1320 in accordance with one embodiment. In one exemplary implementation, replication module 1200 is similar to Intelligent Verification Module 1120. Intelligent Verification Module 1120 can include instructions for performing an Intelligent Verification method (e.g., method 900, etc.). Primary System Quiescing Module 1310 puts directs the primary system to enter a quiescent state. Relevant Storage Location Identification Module 1330 identifies or determines relevant storage locations (e.g., locations that are in use, that have been written to, etc.). Primary System Snapshot Module 1330 takes a snapshot of the relevant portions of the primary system image. Marker Injection Module 1340 injects a indicator corresponding the snapshot to indicate when the snapshot was taken. Primary System un-Quiescing Module 1350 can optionally un-quiesce the primary system. Secondary System Snapshot Module 1360 takes a snapshot of the secondary system. Snapshot Comparison Module 1370 compares the primary system snapshot and the secondary system snapshot. Correction Module 1380 correct discrepancies in the snapshots.

Figure 14:
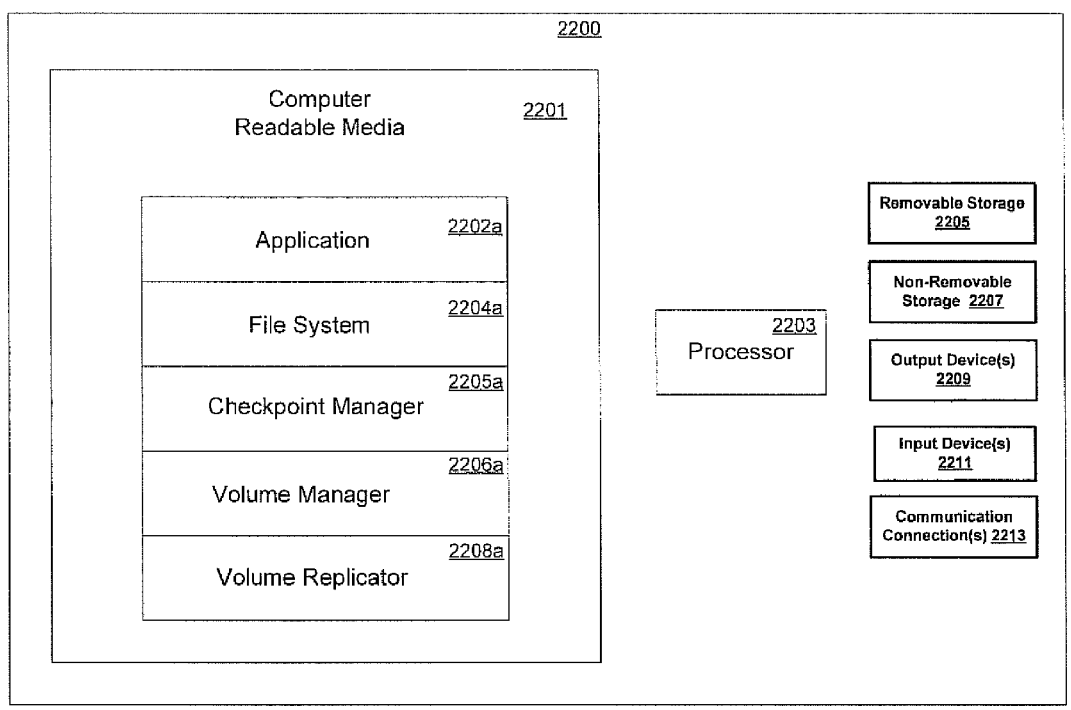
FIG. 14 shows an exemplary computer system according to one embodiment.

FIG. 14 shows an exemplary computer system 2200 according to one embodiment. Computer system 2200 depicts the components of a basic computer system providing the execution environment for certain hardware-based and software-based functionality for the above described embodiments. In one embodiment, computer system 2200 can be a system upon which the one or more software stacks (e.g., modules 1702-1708, 1750, 1810-1860, 1910-1960, 2010-2060, 2110-2150, etc.) are instantiated. Computer system 2200 can be implemented as, for example, a server computer system, workstation computer system, desktop computer system, or laptop computer system. Similarly, computer system 2200 can be implemented as a handheld device. Computer system 2200 typically includes at least some form of computer readable media (e.g., computer readable media 2201). Computer readable media can also be a number of different types of media that can be accessed by computer system 2200 and can include, but is not limited to, removable and non removable computer storage media, flash memory, hard disk, optical disk drive, compact disk (CD) etc.).

In one basic configuration, computer system 2200 typically includes processing unit 2203 and memory 2201. Depending on the exact configuration and type of computer system 2200 that is used, memory 2201 can be volatile (e.g., such as DRAM, etc.) 2201a, non-volatile 2201b (e.g., such as ROM, flash memory, etc.) or some combination of the two. Similarly, the memory 2201 can comprise other devices recites solid-state devices, such as, for example, magnetic disk-based media, optical media, or the like.

Additionally, computer system 2200 can include other mass storage systems (e.g., removable 2205 and/or non-removable 2207) such as magnetic or optical disks or tape. Similarly, computer system 2200 can include input devices 2209 and/or output devices 2211 (e.g., such as a display). Computer system 2200 can further include network connections 2213 to other devices, computers, networks, servers, etc. using either wired or wireless media.

It should further be noted, that the computer system 2200 can have some, most, or all of its functionality supplanted by a distributed computer system having a large number of dispersed computing nodes, as would be the case where the functionality of the computer system 2200 is partly or wholly executed using a cloud computing environment.

Figure 15:
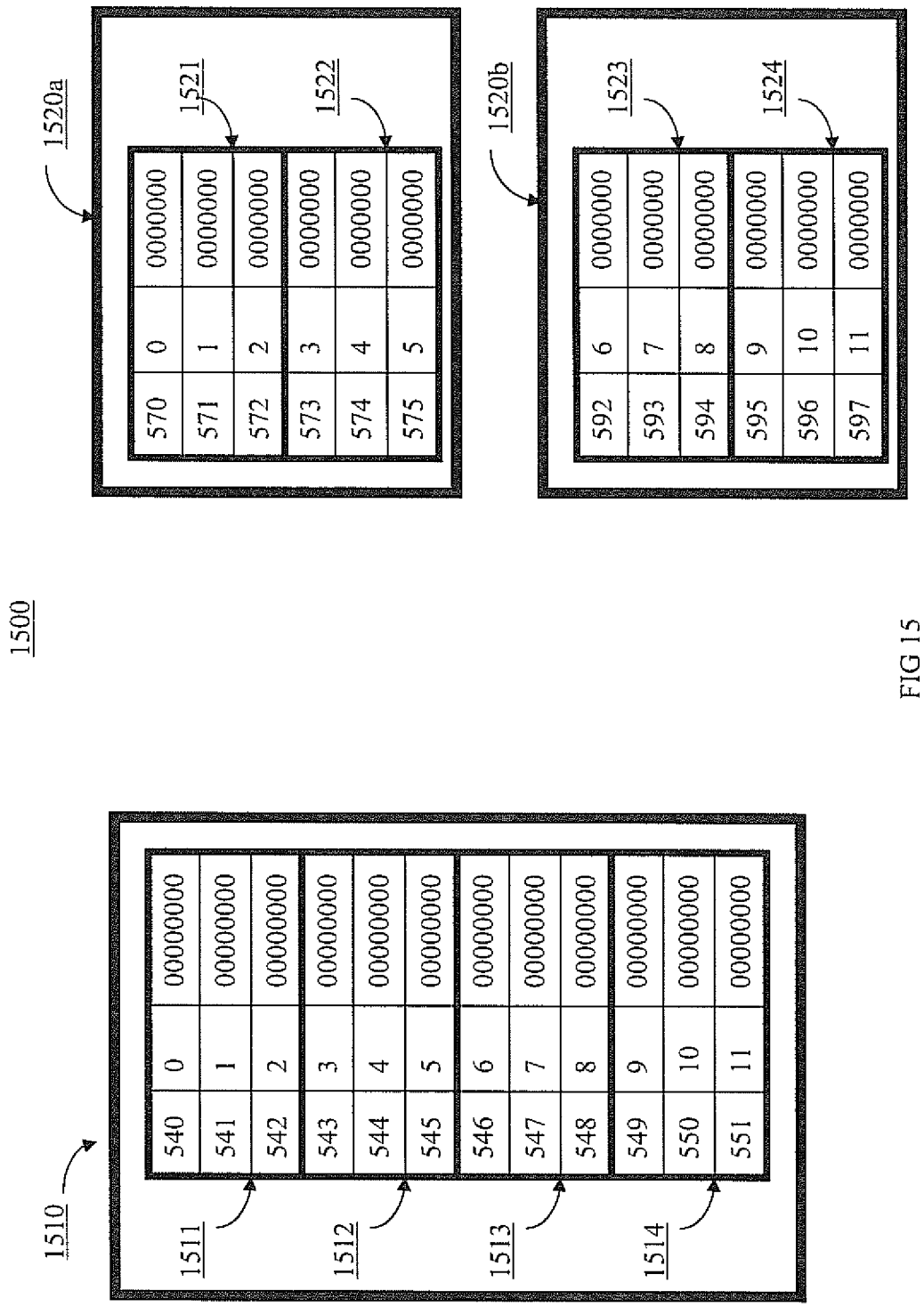
FIG. 15 is a block diagram of an exemplary image configuration in accordance with an embodiment.

It is appreciated the present systems can be readily implemented in a variety of configurations. FIG. 15 is a block diagram of an exemplary image configuration 1500 in accordance with an embodiment. Primary storage volume 1510 includes storage ranges or blocks 1511 through 1514. Storage block 1511 includes relative storage address locations 0 through 2 at physical addresses 540 through 542, storage block 1512 includes relative storage address locations 3 through 5 at physical addresses 543 through 545, storage block 1513 includes relative storage address locations 6 through 8 at physical addresses 546 through 548, and storage block 1514 includes relative storage address locations 9 through 11 at physical addresses 549 through 551. Secondary storage volume 5202 includes storage ranges or blocks 1521 through 1522 and secondary storage volume 5202b includes storage ranges or blocks 1521 through 1522. Storage block 521 includes relative storage address locations 0 through 2 at physical addresses 570 through 572, storage block 522 includes relative storage address locations 3 through 5 at physical addresses 573 through 575, storage block 523 includes relative storage address locations 6 through 8 at physical addresses 592 through 594, and storage block 514 includes relative storage address locations 9 through 11 at physical addresses 595 through 597. While the relative or virtual addresses of the primary storage volume 1510 and secondary storage volumes 1520a and 15020b can match the physical addresses do not have to. It is appreciated that primary and secondary volumes can be divided into different storage media. For example, storage volumes 1520a and 15020b can be included in different physical media at different locations.

The present replication systems and methods facilitate efficient and effective replication of information. The information replication can be flexibly and incrementally performed for portions of a storage system image that change during operation sessions. The systems and methods can verify replication is accurately performed. The systems and methods can be implemented as run time processing. The replication and verification are intelligently performed while avoiding reading, writing, transmitting and verifying portions of storage resources that are irrelevant or not in use, such activities can be reduced or avoided. The systems and methods also facilitate utilization of thinly provisioned secondary or target storage resources. Present systems and methods can reduce consumption of network bandwidth and I/O bandwidth on both primary and secondary sides. In one exemplary implementation, the time taken for initial synchronization is a function of file system usage and not the size of the volume.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in modulated data signals such as carrier waves or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A replication method comprising:
    performing an intelligent synchronization process of relevant portions of an image, wherein said intelligent synchronization process comprises at least determining if information within a storage range is in use by receiving and examining a mapping of the information within the storage range, wherein the storage range is a dynamically configurable; and
    performing an intelligent storage verification process, wherein said intelligent storage verification process comprises:
        quiescing a primary system;
        determining portions of primary system storage resources of the primary system that are in use;
        taking a primary snapshot of primary system storage information associated with said primary system storage resources that is in use;
        injecting a marker in a data stream from said primary system;
        taking a secondary snapshot of secondary system storage information associated with secondary system storage resources of a secondary system that is in use; and
        comparing said primary snapshot to said secondary snapshot;
    wherein the intelligent synchronization process further comprises forwarding information within the storage range to the secondary system storage resources in the event said information is determined to be in use.

2. The method of claim 1 wherein said intelligent synchronization process further comprises:
incrementing a storage location indication in accordance with said storage range.

3. The method of claim 2 wherein said determining if information within the storage range of the primary system storage sources is in use includes querying a file system.

4. The method of claim 1 wherein the primary system storage resources comprise thick provisioned storage resources and the secondary system storage resources comprise thinly provisioned storage resources.

5. The method of claim 1 wherein said storage range is similar to a storage block.

6. The method of claim 1 wherein said storage range is dynamically configurable to natural boundaries of storage resources.

7. The method of claim 1 wherein said primary snapshot is included in a primary storage resource and said secondary snapshot is included in a secondary storage resource.

8. The method of claim 1 wherein said intelligent synchronization process includes determining if information in a primary source is different from a secondary source.

9. The method of claim 8 further comprising performing a correction process for portions of said secondary system storage information that does not match corresponding portions of said primary system storage information.

10. A non-transitory computer readable storage medium having stored thereon computer-executable instructions that when executed by a computing device cause the computing device to perform a method comprising:
performing an intelligent synchronization process of relevant portions of an image, wherein said intelligent synchronization process comprises at least determining if information within a storage range is in use by receiving and examining a mapping of the information within the storage range, wherein the storage range is dynamically configurable; and
performing an intelligent storage verification process, wherein said intelligent storage verification process comprises:
quiescing a primary system;
determining portions of primary system storage resources of the primary system that are in use;
taking a primary snapshot of primary system storage information associated with said primary system storage resources that is in use;
injecting a marker in a data stream from said primary system;
taking a secondary snapshot of secondary system storage information associated with secondary system storage resources of a secondary system that is in use; and
comparing said primary snapshot to said secondary snapshot;
wherein the intelligent synchronization process further comprises forwarding information within the storage range to the secondary system storage resources in the event said information is determined to be in use.

11. The computer readable storage medium of claim 10 wherein said intelligent synchronization process further comprises:
incrementing a storage location indication in accordance with said storage range, wherein the primary system storage resources comprise thick provisioned storage resources and the secondary system storage resources comprise thinly provisioned storage resources.

12. The computer readable storage medium of claim 10 wherein said storage range is a storage block.

13. The computer readable storage medium of claim 10 wherein said storage range is dynamically configurable to natural boundaries of storage resources.

14. The computer readable storage medium of claim 10 wherein said primary image is included in a primary storage resource and said secondary image is included in a secondary storage resource.

15. The computer readable storage medium of claim 10 wherein intelligent synchronization process includes determining if information in a primary source is different from a secondary source.

16. The computer readable medium of claim 15 further comprising performing a correction process for portions of said secondary system storage information that does not match corresponding portions of primary system storage information.

17. A multivolume file system, comprising:
a computer system having a processor coupled to a computer readable storage media and executing computer readable code which causes the computer system to:
perform an intelligent synchronization process of relevant portions of an image, wherein said intelligent synchronization process comprises at least determining if information within a storage range is in use by receiving and examining a mapping of the information within the storage range, wherein the storage range is dynamically configurable; and
perform an intelligent storage verification process, wherein said intelligent storage verification process comprises:
quiesce a primary system;
determine portions of primary system storage resources of the primary system that are in use;
take a primary snapshot of primary system storage information associated with said primary system storage resources that is in use;
inject a marker in a data stream from said primary system;
take a secondary snapshot of secondary system storage information associated with secondary system storage resources of a secondary system that is in use; and
compare said primary snapshot to said secondary snapshot;
wherein the intelligent synchronization process further comprises forwarding information within said storage range to the secondary system storage resources in the event said information is determined to be in use.

18. The system of claim 17 wherein said intelligent synchronization process further comprises:
incrementing a storage location indication in accordance with said storage range, wherein the primary system storage resources comprise thick provisioned storage resources and the secondary system storage resources comprise a thinly provisioned storage resource.

19. The system of claim 17 wherein said intelligent synchronization process includes determining if information is in use includes querying a file system.

* * * * *